United States Patent [19]

Morimoto et al.

[11] Patent Number: 4,951,153

[45] Date of Patent: Aug. 21, 1990

[54] IMAGE RECORDING DEVICE WITH OPTICAL SWITCH PANEL OVER PHOTSENSITIVE BODY

[75] Inventors: Kenichi Morimoto, Nara; Takao Tagawa, Kashihara, both of Japan

[73] Assignee: Sharp Kabushiki Kaisha, Osaka, Japan

[21] Appl. No.: 352,973

[22] Filed: May 17, 1989

Related U.S. Application Data

[60] Division of Ser. No. 225,628, Jul. 27, 1988, Pat. No. 4,855,818, which is a continuation of Ser. No. 120,699, Nov. 10, 1987, abandoned, which is a continuation of Ser. No. 943,815, Dec. 29, 1986, abandoned, which is a continuation of Ser. No. 748,487, Jun. 25, 1985, abandoned.

[30] Foreign Application Priority Data

Jul. 4, 1984 [JP] Japan ................................. 59-130650
Jul. 4, 1984 [JP] Japan ................................. 59-130651

[51] Int. Cl.⁵ ............................................ H04H 1/21
[52] U.S. Cl. ..................................... 358/296; 358/300
[58] Field of Search ..................... 358/296, 300, 302; 350/330, 331 R, 344, 355, 356, 357

[56] References Cited

U.S. PATENT DOCUMENTS

| | | | |
|---|---|---|---|
| 3,742,600 | 7/1973 | Lowell | 350/344 |
| 4,295,712 | 10/1981 | Ishiwatari | 350/344 |
| 4,297,022 | 10/1981 | Lester | 350/331 R |
| 4,334,734 | 6/1982 | Hareng et al. | 350/331 R |
| 4,504,119 | 3/1985 | Sekimoto et al. | 358/302 |
| 4,549,223 | 10/1985 | Ozawa | 358/300 |
| 4,591,886 | 5/1986 | Umeda et al. | 358/300 |
| 4,855,818 | 8/1989 | Morimoto et al. | 358/75 |

*Primary Examiner*—Edward L. Coles, Sr.
*Attorney, Agent, or Firm*—Flehr, Hohbach, Test, Albritton & Herbert

[57] ABSTRACT

An image recording device has an optical switch panel disposed nearly or directly in contact with a photosensitive body. The optical switch panel contains many liquid crystal display dot elements between a pair of boundary layers and serves to form on the photosensitive body an image which is displayed on the optical switch panel. The boundary layer on the side of the photosensitive body is significantly thinner than that distal therefrom.

11 Claims, 2 Drawing Sheets

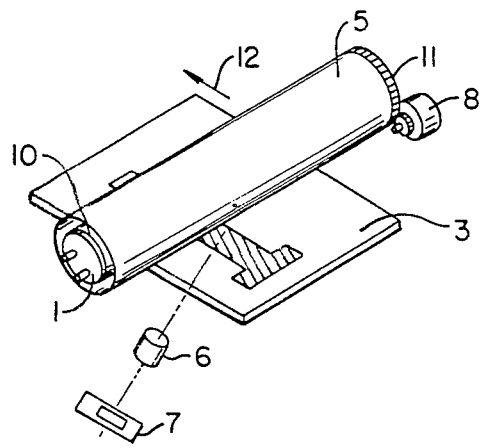
FIG._1.
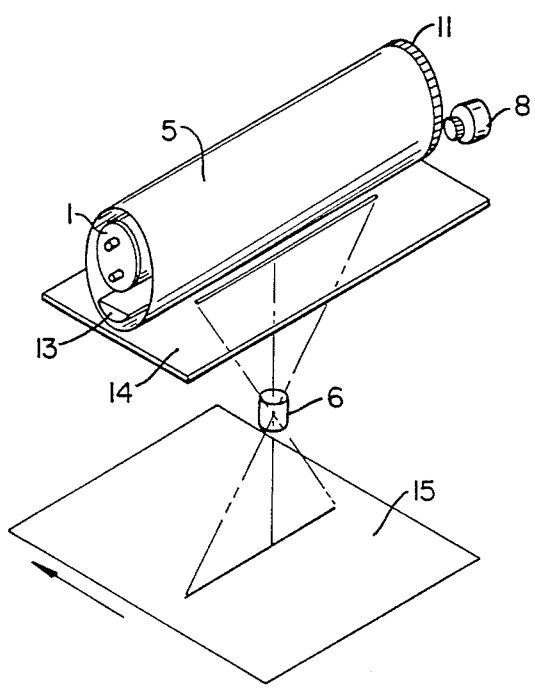
FIG._2.
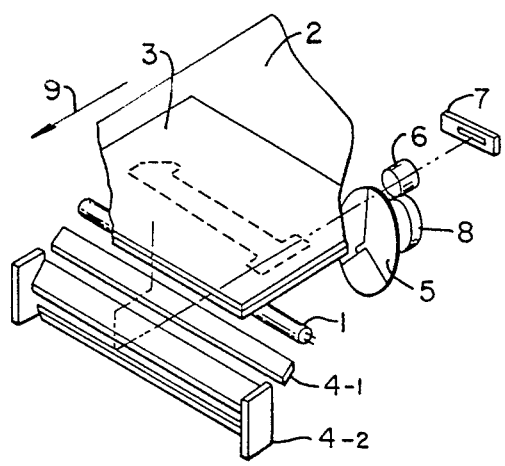
FIG._3.   PRIOR ART

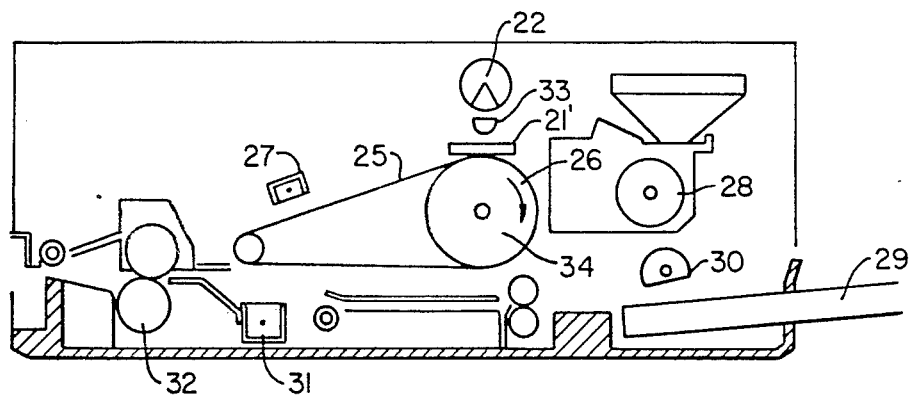
FIG._4.
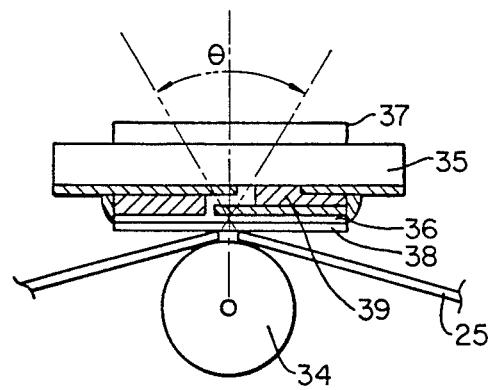
FIG._5.
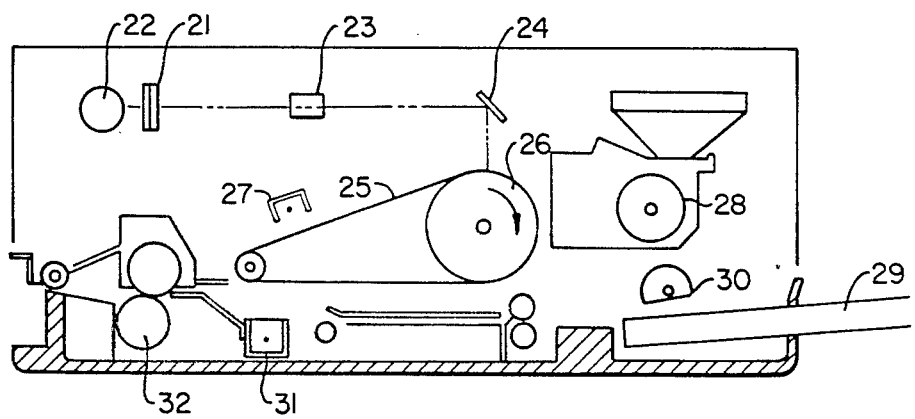
FIG._6. PRIOR ART

IMAGE RECORDING DEVICE WITH OPTICAL SWITCH PANEL OVER PHOTSENSITIVE BODY

This is a divisional of application Ser. No. 225,628 filed July 27, 1988 now U.S. Pat. No. 4,855,818, which is a continuation of application Ser. No. 120,699 filed Nov. 10, 1987, now abandoned which is a continuation of application Ser. No. 943,815 filed Dec. 29, 1986, now abandoned, which is a continuation of application Ser. No. 748,487 filed June 25, 1985, now abandoned.

This invention relates to a recording device with a liquid crystal optical switch panel made of a plurality of liquid crystal display dot elements so that a display image on the panel can be formed and recorded on a photosensitive film or paper such as OPC (organic photoconductor).

A conventional color scanner, as shown in FIG. 3, uses a white fluorescent lamp 1 to scan a document 3 on a table 2 which moves in the direction of arrow 9. The reflected light is lead to a disk-shaped RGB color filter 5 by means of mirrors 4-1 and 4-2 and the transmitted light is focused by a lens 6 so that an optical image of the document 3 will be formed on a CCD sensor 7. The RGB color filter 5 is divided into three filter areas which are red (R), green (G) and blue (B) and its center is directly connected to the axis of rotation of a motor 8 which rotates in synchronism with the scanning of the CCD sensor. In short, the reflected light from the document is decomposed into color components by the rotation of the RGB color filter 5 and they are detected by the CCD sensor 7 and outputted, for example, as a 3-bit color information.

Since the RGB color filter 5 is so positioned in the conventional apparatus described above that only a portion of it is on the optical path of the deflected light from the document 2, while a large portion of it sticks out of the optical path, the apparatus as a whole inevitably becomes large. As for the white fluorescent lamp 1 used in this apparatus, variations in its luminance due to the ambient temperature are known to be great. For example, its luminance at 30° C. is about one-half of that at 0° C. For this reason, a laminate heater is commonly installed around a fluorescent lamp, the temperature of the laminate heater being detected by a thermostat or the like so that the wall temperature of the fluorescent lamp will be maintained at 30°–40° C. Power of 50–70W is typically consumed by such a laminate heater.

It is therefore an object of this invention in view of the above to provide a document reading apparatus with a color filter formed in a cylindrical shape, having a light source inside this cylinder so that the apparatus can be made smaller and its power consumption can be reduced.

In order to explain another aspect of the present invention, there is shown in FIG. 6 a conventional recording apparatus for recording on paper an image displayed on a liquid crystal optical switch panel. A lamp 22 is provided behind a liquid crystal optical switch panel 21 made of liquid crystal display dot elements and the light beam from the lamp 22 passing through the panel 21 is lead to a photosensitive body 25 by means of a lens 23 and a mirror 24 in such a way that the display on the liquid crystal optical switch panel 21 will be focused by the lens 23. Numeral 27 is a charging means and a latent image is formed on the photosensitive body 25 while it moves in the direction of arrow 26 in synchronism with the operation of the liquid crystal display dot elements. The latent image formed here is made visible in a developing means 28 and this visible image is copied by a copier 31 on a recording sheet which is sent in from a cassette 29 by a roller 30 in synchronism with the motion of the photosensitive body 25. The recording sheet is subsequently sent to a fixer 32 where the visible image is fixed, and then is taken out of the device.

There have been various attempts to improve the recording quality of a device of this type in view of the low sensitivity of the body 25. Very bright light sources such as halogen lamps have been tried and the opening angle of the lens 23 has been enlarged to improve its optical efficiency. If a bright light source is used, however, the heat generated by it raises the ambient temperature and deteriorates the characteristics of the liquid crystal optical switch panel and the photosensitive material. If the lens opening is made larger, on the other hand, the $\cos^4 \theta$ rule comes into play and there arise problems of operation as well as adjustment of the optical system because the focal depth becomes reduced. The cost of the lens will also increase in this situation.

It is therefore another object of this invention in view of the above to provide a recording device in which a liquid crystal optical switch panel is installed differently so that the recording quality can be improved even with a material with low photosensitivity and further that the optical system can be simplified, the device can be made smaller and its manufacturing cost can be reduced.

FIG. 1 is a schematic showing the structure of a document reading apparatus according to one embodiment of the present invention.

FIG. 2 is a schematic showing the structure of another document reading apparatus according to the present invention.

FIG. 3 is a schematic showing the structure of a conventional document reading apparatus.

FIG. 4 is a schematic showing the structure of a recording device embodying the present invention.

FIG. 5 is an enlarged view of a portion of the device of FIG. 4.

FIG. 6 is a schematic showing the structure of a conventional recording device.

In FIG. 1, which is a schematic showing the structure of a document reading apparatus according to one embodiment of the present invention, numeral 1 is a white fluorescent lamp with an aperature, having a reflective layer on a portion of its tube. A laminate heater 10 is provided on its tube wall. A heater control circuit is provided to this laminate heater so that the wall temperature will be always maintained at about 40° C. Numeral 3 indicates a document adapted to be automatically moved in the direction of arrow 12 in synchronism with the light scanning. A phototransmissive film document is used here in particular. Numeral 5 is a cylindrically formed RGB color filter with its sidewall equally divided in the axial direction into three RGB filter areas. The white fluorescent light 1 is contained inside this cylindrical filter 5 as shown. On the periphery of the filter 5 at one of its ends, there is provided a gear 11 which engages with another gear on the rotary axis of a motor 8 so that only the main filter body is controllably rotated by 120° in synchronism with the scanning of a CCD sensor 7. Numeral 6 is a lens for collecting the transmitted light from the document to form an optical image of the document on the CCD sensor 7.

In summary, light from the white fluorescent lamp 1 of this document reading apparatus thermally controlled by the laminate heater 10 illuminates the document 3 through a cylindrical color filter 5 and the transmitted beam is focused by the lens 6 to form an image on the CCD sensor 7. The cylindrical color filter 5 is rotated by 120° each time so that three light sources for R, G and B are formed and the beams from these sources are made incident on the same portion of the document 3 so that its color information can be read out.

Since the white fluorescent lamp 1 is contained inside the RGB color filter 5 formed in a cylindrical shape, the light source and the filter can be constructed as a single unit and the apparatus can thus be made extremely compact. Moreover, since the white fluorescent lamp 1 is surrounded by the cylindrical color filter 5, the heat generated by the laminate heater 10 is not diffused away easily. Accordingly, power consumption by the laminate heater 10 can be significantly reduced.

Another embodiment of the present invention is illustrated in FIG. 2 wherein components similar to those in FIG. 1 are indicated by the same numerals.

This embodiment is characterized in that the cylindrical color filter 5 contains therein not only the white fluorescent lamp 1, but also a cylindrical plano-convex lens 13 for linearly focusing the light from the lamp 1 and that only the color filter 5 will rotate around them so that color correction can be effected inclusive of the optical system such as the cylindrical lens 13. This embodiment is adapted to focus a display on a liquid crystal switch panel 14 made of a plurality of dot elements through a lens 6 on a photosensitive film 15 for recording.

In summary, a document reading apparatus of this invention has a cylindrical color filter containing a light source inside so that the apparatus can be made compact, the luminence of the source can be stably maintained and the power consumption can be reduced.

FIG. 4 shows the structure of a recording device according to the present invention. Components shown therein which are similar to those in FIG. 6 are indicated by like numerals. Thus, numeral 21' is a liquid crystal optical switch panel, numeral 22 is a fluorescent lamp with an aperature, numeral 25 is a photosensitive body, numeral 27 is a charging means, numeral 28 is a developer by means of which a latent image on the photosensitive body 25 is made visible or a visible image (such as a toner image) is obtained, numeral 29 is a cassette for containing recording paper, numeral 30 is a roller for feeding recording paper from the cassette 29 in synchronism with the motion of the photosensitive body 25, numeral 31 is a copier for copying the visible image on the photosensitive body 25 onto the recording paper, numeral 32 is a fixer for fixing the image copied on the recording paper, numeral 33 is a cylindrical plano-convex lens, and numeral 34 is a driving drum for moving the photosensitive body 25. The liquid crystal optical switch panel 21' has thin display surfaces which are parallel to the axial direction of the drum 34, each with a width of about 0.1mm corresponding to one or several lines (the line length being nearly equal to the transverse width of the photosensitive body 25) and can be driven for each dot by a display driving circuit. In other words, it is so structured that each dot can be operated as a small optical shutter.

From the point of view of basic construction, the liquid crystal optical switch panel 21' of this invention is no different from the conventional panel, having liquid crystal sealed between glass substrates 35 and 36 and being provided with polarization plates 37 and 38 as shown in FIG. 5. As will be explained immediately below, however, the liquid crystal optical switch panel 21' of this invention is substantially different from the conventional type.

Firstly, the total thickness of the glass substrate 36 and the polarization plate 38 on the side facing the photosensitive body 25 is made extremely small (0.2 mm or less) while it was conventionally about 1.3 mm or more. This prevents the image from broadening on the photosensitive body 25 even if the angle of incidence 8 becomes large so that high-quality recording can be effected.

Secondly, there is a spacer 39 inserted, as shown in FIG. 5, at a position other than the space corresponding to one or more lines where a liquid crystal is sealed in. This prevents deformation of this space by an external force when the panel comes into direct contact with the photosensitive body 25 on the drum 34. The total thickness of the glass substrate 35 and the polarization plate 37 on the side facing the cylindrical lens 33, however, is about the same as the conventional value (about 2-3 mm) so as to give a sufficient strength to the structure.

The liquid crystal optical switch panel 21' thus constructed is disposed near or in direct contact with the photosensitive body 25 on the drum 34 so that the light from the fluorescent lamp 22 which has been focused into a single line by the cylindrical lens 33 thereabove will illuminate the display surface of the switch panel 21'. Accordingly, a latent image of an entire display can be formed on the photosensitive body 25 by rotating the drum 34 in the direction of the arrow 26 in synchronism with the timing of image display corresponding to one line or several lines on the display surface of the liquid crystal optical switch panel 21'. This latent image is made visible as a toner image by the developer 28, copied on recording paper by the copier 31 and fixed by the fixer 32.

In summary, the present invention teaches the improved liquid crystal optical switch panel 21' to be placed near or in direct contact with a photosensitive material for recording. Since the distance between the light source 22 and the photosensitive body 25 has been made much shorter, a light source which is no brighter than a fluorescent lamp can be used with a photosensitive body 25 of low sensitivity for recording. Moreover, the liquid crystal optical switch panel 21' is thin on the side of the photosensitive body 25 but no deformation will result from a pressure on its body because although the part containing liquid crystal is only about 279 0.1 mm in thickness, the panel is additionally protected by the spacer 39. Thus, recording of very high quality can be effected by a device of the present invention. Furthermore, since the optical system can be simplified and made smaller as shown in FIGS. 4 and 6, the manufacturing cost of the device can be significantly reduced.

Although only one example of recording device using the electronic photography process and a photosensitive body such as organic photoconductor has been shown above, the present invention can be equally applicable to a recording device depending on the conventional photographic process and a photosensitive film or paper. If a liquid crystal optical switch panel 21' of a flexible type is used, furthermore, it can be matched to the curvature of the photosensitive body 25 caused by the drum 34 and its durability can be improved.

What is claimed is:

1. An image recording device comprising
a photosensitive member, and an optical system which includes a liquid crystal optical switch panel with a plurality of liquid crystal display dot elements between a first boundary layer and a second boundary layer, and serves to form on said photosensitive member an image displayed on said liquid crystal optical switch panel, said first boundary layer being disposed nearly or directly in contact with said photosensitive member and significantly thinner than said second boundary layer which is separated from said photosensitive member.

2. The recording device of claim 1 wherein said plurality of liquid crystal display dot elements form at least one thin display surface for displaying one or more lines of an image.

3. The recording device of claim 2 wherein said liquid crystal optical switch panel has a spacer disposed outside said at least one thin display surface formed by said plurality of liquid crystal display dot elements.

4. The recording device of claim 1 wherein said liquid crystal optical switch panel has flexible substrates.

5. The recording device of claim 2 wherein each said at least one thin display surface has a width of about 0.1 mm.

6. The recording device of claim 2 wherein liquid crystal is sealed in said liquid crystal display dot elements.

7. The recording device of claim 3 wherein liquid crystal is sealed in said liquid crystal display dot elements.

8. The recording device of claim 1 wherein both said first and second boundary layer include a glass substrate and a polarization plate.

9. The recording device of claim 1 wherein said second boundary layer is about 2-3 mm in thickness.

10. The recording device of claim 1 wherein said first boundary layer is 0.2 mm or less in thickness.

11. The recording device of claim 1 wherein said second boundary layer is about 2-3 mm in thickness.

* * * * *

UNITED STATES PATENT AND TRADEMARK OFFICE
CERTIFICATE OF CORRECTION

PATENT NO. : 4,951,153
DATED : August 21, 1990
INVENTOR(S) : Kenichi Morimoto, et al.

It is certified that error appears in the above-identified patent and that said Letters Patent is hereby corrected as shown below:

Column 4, line 10, change "8" to --$\theta$--.

Column 4, line 49, delete "279".

Signed and Sealed this

Thirty-first Day of March, 1992

Attest:

HARRY F. MANBECK, JR.

Attesting Officer     Commissioner of Patents and Trademarks